US005812084A

United States Patent [19]

Bonanni et al.

[11] Patent Number: 5,812,084

[45] Date of Patent: Sep. 22, 1998

[54] METHOD FOR ESTIMATING THE PRECISE ORIENTATION OF A SATELLITE-BORNE PHASED ARRAY ANTENNA AND BEARING OF A REMOTE RECEIVER

[75] Inventors: Pierino Gianni Bonanni, Clifton Park; Jeffrey Michael Ashe, Gloversville; Seth David Silverstein, Schenectady, all of N.Y.

[73] Assignee: General Electric Company, Schenectady, N.Y.

[21] Appl. No.: 768,005

[22] Filed: Dec. 13, 1996

[51] Int. Cl.[6] .................... H04B 7/185

[52] U.S. Cl. .................... 342/352; 342/174; 342/354

[58] Field of Search .................... 342/352, 354, 342/372, 174

[56] References Cited

U.S. PATENT DOCUMENTS

| | | | |
|---|---|---|---|
| 4,599,619 | 7/1986 | Keigler et al. | 343/352 |
| 4,630,058 | 12/1986 | Brown | 342/359 |
| 4,658,361 | 4/1987 | Kosaker et al. | 364/434 |
| 5,258,764 | 11/1993 | Malinowski | 342/359 |
| 5,355,138 | 10/1994 | Cances et al. | 342/354 |
| 5,572,219 | 11/1996 | Silverstein et al. | 342/375 |

OTHER PUBLICATIONS

U.S. Patent Application 08/449,796, SD Silverstein, RL Nevin, WE Engeler, "Method and Apparatus For Remotely Calibrating A Phased System Used For Satellite Communication Using A Unitary Transform Encoder", filed Jul. 7, 1995.

*Primary Examiner*—Thomas H. Tarcza
*Assistant Examiner*—Dao L. Phan
*Attorney, Agent, or Firm*—Marvin Snyder; Douglas E. Stoner

[57] ABSTRACT

The precise three-axis attitude of a space-borne phases-array antenna is estimated based on the assumption that the array geometry, consisting of the number of radiating elements and their relative spacing in three dimensions, is known and that the array position and coarse knowledge of the array attitude are available a priori. An estimate is first made of the set of complex-valued gains that define each element's straight-through contribution to the signals received at each of two or more remote calibration sites, where a "straight-through" antenna configuration is defined as the condition in which all elements are made to radiate with the same amplitude and phase. An optimization strategy is then used to determine which array attitude lying in the neighborhood of the coarsely known attitude is most consistent with the full set of straight-through gain values. Another technique for estimating the precise angular location of a receiver with respect to the coordinates of the space-borne phased-array antenna is based on the assumptions that the array geometry is known, and that the receiver bearing is coarsely known or available. After an estimate is made of the set of complex-valued gains that define each element's straight-through contribution to a composite signal measured at the receiver site, an optimization strategy is used to determine which receiver direction lying in the neighborhood of the coarsely known direction is most consistent with the latter set of straight-through gain values.

6 Claims, 3 Drawing Sheets

METHOD FOR ESTIMATING THE PRECISE ORIENTATION OF A SATELLITE-BORNE PHASED ARRAY ANTENNA AND BEARING OF A REMOTE RECEIVER

BACKGROUND OF THE INVENTION

This invention relates to satellite communications and, more particularly, to a method for estimating the precise three-axis attitude of a space-borne phased-array antenna and the precise angular location of a receiver with respect to the coordinates of the space-borne phased-array antenna.

BACKGROUND DESCRIPTION

Precise attitude knowledge of the orientation of a satellite-borne phased-array antenna is critical when the antenna pattern is highly directed, especially if the satellite serves multiple ground-based transmitter/receiver sites with a high degree of geographic selectivity. Attitude control systems employed on current state-of-the-art commercial communication satellites are capable of sensing and maintaining attitude to within approximately 0.1° in each of three rotational coordinates. For a satellite orbiting the earth at geosynchronous altitude, this corresponds to an uncertainty of approximately 60 km on the ground. However, the orientation of a space-borne phased-array antenna needs to be measured with significantly greater precision than the levels just cited for the next generation of geostationary communication satellites.

In addition, calibration of a satellite-borne phased-array antenna from the ground (or from any remote site) requires precise knowledge of the bearing of the calibration site with respect to the radiation pattern of the array. This is because one needs to distinguish the effects of attitude disturbances from drifts in the phasing circuits of the array elements, both of which are observed as phase shifts at the receiver. Station-keeping maneuvers employed on current state-of-the art commercial communication satellites maintain positional stability to within approximately 75 km. For geostationary satellites, this implies that fixed locations on the earth's surface have a directional uncertainty of approximately 0.1° to 0.2° with respect to a coordinate system local to both the satellite and the array. This level of uncertainty significantly limits the precision with which the array can be calibrated. As a case in point, the phase shifters located at the comers of a 16×16 array with a three wavelength element spacing can drift up to approximately 0.04 cycles in phase before the effect seen at a receiver on the ground begins to exceed that of attitude and position uncertainty. This implies that the maximum phase resolution achievable through ground-based calibration is between four and five bits.

Phased-array payloads being designed for deployment in the next generation of geostationary communication satellites will employ up to 256 levels (i.e., eight bits or $2^8$) of phase resolution. To calibrate such systems from the ground will require at least an order of magnitude improvement either in position and attitude sensing capability or in other means for ascertaining the precise angular coordinates of the calibration site.

SUMMARY OF THE INVENTION

It is therefore an object of the present invention to provide a computer implemented method for estimating the precise orientation of a satellite-borne phased-array antenna during calibration of the array from two more remote sites.

It is another object of the invention to provide a computer implemented method for estimating the precise bearing of a remote receiver with respect to the radiation coverage of a satellite-borne phased-array antenna.

According to one aspect of the invention, a computer implemented technique is provided for estimating the precise three-axis attitude of a space-borne phased-array antenna. The technique assumes that the array geometry, consisting of the number of radiating elements and their relative spacing in three dimensions, is known, and that the array position and coarse knowledge of the array attitude are available a priori. A hypothetical "straight-through" antenna configuration is defined as the condition in which all elements are made to radiate with the same amplitude and phase. The technique according to this aspect of the invention consists of two steps. First, an estimate is made of the set of complex-valued gains that define each element's straight-through contribution to the signals received at each of two or more remote calibration sites. Second, a determination is made by means of a mathematical optimization strategy as to which array attitude lying in the neighborhood of the coarsely known attitude is most consistent with the full set of straight-through gain values determined in the first step.

According to another aspect of the invention, a computer implemented technique is provided for estimating the precise angular location of a receiver with respect to the coordinates of a space-borne phased-array antenna. This technique is based not on any assumption that the array position and attitude are known or available, but instead on the assumptions that the array geometry is known, as in the first-described technique, and that the receiver bearing is coarsely known or available. This technique, like the first-described technique, consists of two steps. First, an estimate is made of the set of complex-valued gains that define each element's straight-through contribution to a composite signal measured at the receiver site. Second, a determination is made by means of a mathematical optimization strategy as to which receiver direction lying in the neighborhood of the coarsely known direction is most consistent with the straight-through gain values determined in the first step.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawings, in which:

DETAILED DESCRIPTION OF PREFERRED EMBODIMENTS OF THE INVENTION

Figure 1:
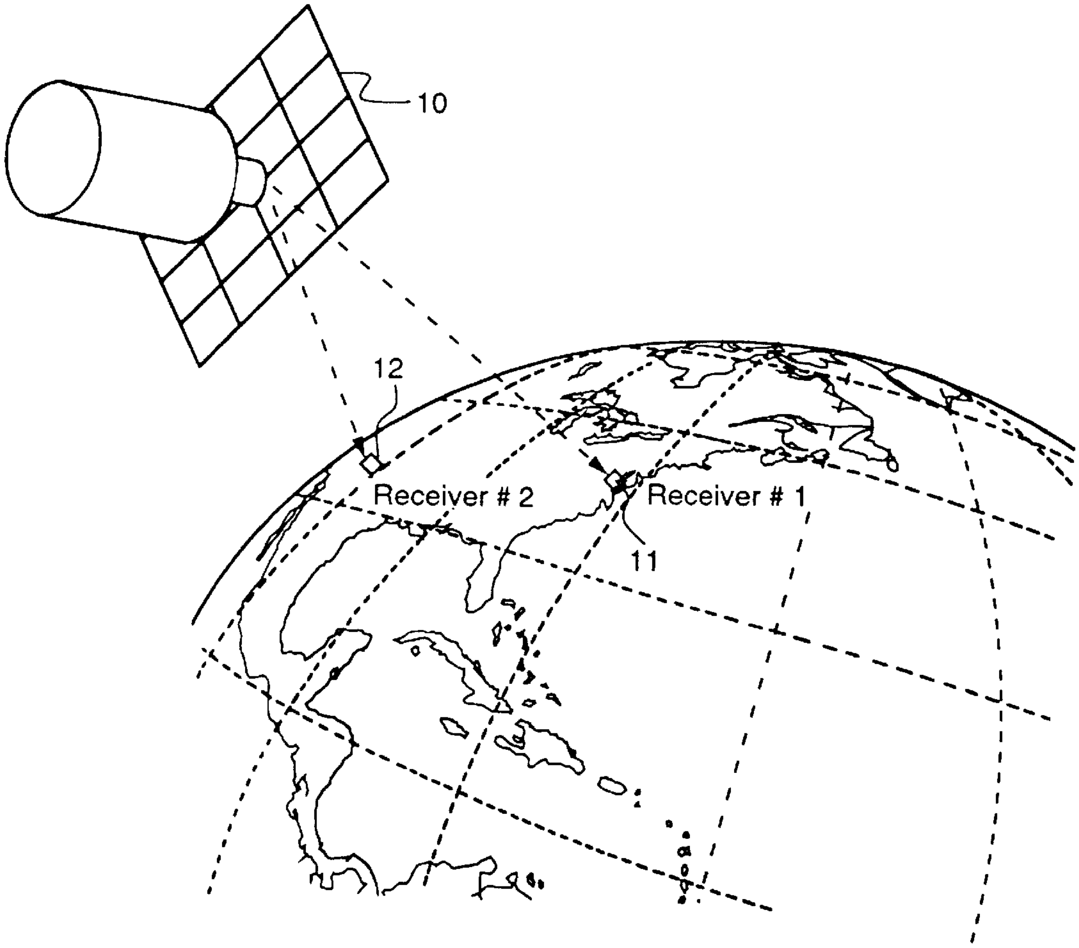
FIG. 1 is a pictorial diagram illustrating a satellite-borne phased-array antenna and a plurality of remote ground-based receivers.

FIG. 1 illustrates a satellite-borne phased-array antenna 10 made up of a plurality of radiating elements, and a plurality of remote ground-based receivers 11 and 12, here referred to as Receiver #1 and Receiver #2, respectively. Orientation of space-borne phased-array antenna 10 according to a first aspect of the invention requires use of two or more earth-based receivers 11 and 12 whose precise geographical coordinates are known. The technique itself is a two-step procedure which is schematically represented in the block diagram of FIG. 2, to which reference is now made.

The first step requires measurement at each receiver site of the so-called "straight-through" signal path gains, as generally indicated at function blocks $\mathbf{21}_1$ to $\mathbf{21}_M$. These straight-through gains, which are complex-valued, represent the magnitude and phase that a unit signal attains as it flows through the amplifier chain and propagation path associated with each element in an unsteered array. An unsteered array is defined as one whose elements are made to radiate with a uniform amplitude and phase, represented by a single complex gain value k. In the description that follows, it is assumed that the receiver lies within a region over which the array elements radiate isotropically and that the propagation path is free of atmospheric disturbances.

Let $G^m_n$ denote the gains at receiver site m, where m=1,2, . . . ,M, and M is the number of receiver sites used in the procedure. As seen from the mth receiver site, the straight-through gain for the nth element is given by $$G_n^m = k\frac{e^{j\frac{2\pi}{\lambda}|\bar{R}_m-\bar{r}_n|}}{|\bar{R}_m-\bar{r}_n|},$$

where $\bar{R}_m$ is the receiver position, $\bar{r}_n$ are the element positions expressed in the local coordinate frame, and $\lambda$ is wavelength. In the far field, i.e., where $|\bar{r}_n|^2 << \lambda|\bar{R}_m|$, $G^m_n$ can be rewritten as $$G_n^m = k\frac{e^{j\frac{2\pi}{\lambda}R_m}}{R_m}e^{-j\frac{2\pi}{\lambda}(\hat{u}_m\cdot\bar{r}_n)} = \kappa_m e^{-j\frac{2\pi}{\lambda}(\hat{u}_m\cdot\bar{r}_n)},$$

where $$\kappa_m = \left(\frac{k}{R_m}\right)e^{j\frac{2\pi}{\lambda}R_m},$$

$R_m=|\bar{R}_m|$, and $\hat{u}_m$ is a vector directed toward the receiver from the local origin.

In a steered array, the total gain imposed by each element is the product of $G^m_n$ and a selectable gain $A_n$, which, in combination, fully characterize the signal response of the array at the given receiver site. The attitude estimation method described here makes use of the straight-through gains $G^m_n$ measured at two or more receiver sites, but requires no knowledge of the selected gains $A_n$. Any method deemed suitable for measuring these straight-through gains can be successfully used in the attitude estimation procedure. One such procedure encodes coherent signals from the phased array elements using controlled switching of the gain and phase shifter delay circuits. Such procedure is set forth in Silverstein et al., U.S. Pat. No. 5,572,219, issued Nov. 5, 1996. For N elements, the control circuit switching is dictated by matric elements of an N×N Hadamard matrix. The encoded signal vectors are decoded with the inverse of the same Hadamard matrix used in the control circuit encoding. Other methods can be used in the attitude estimation procedure, and the invention is not dependent on the particular method used.

To implement the second step in the attitude estimation procedure, a model is constructed for the full set of straight-through gains:

$$\bar{G}_n^m(\alpha_m,\Theta) = \alpha_m e^{-j\frac{2\pi}{\lambda}[\hat{u}_m(\Theta)\cdot\bar{r}_n]} = \alpha_m\phi_{nm}(\Theta).$$

In this expression, $\alpha_m$ is a site-dependent, unknown complex amplitude, and $\Theta$ represents a set of angles that define the attitude of the array. As the array position and all receiver positions are assumed known, the array attitude determines all receiver directions $\hat{u}_m$. It is convenient to think of $\Theta$ as consisting of three orthogonal component angles which specify the rotation that the nominal known attitude must undergo to give the true array attitude. The attitude estimation problem thus reduces to finding that set of rotational angles (i.e., roll, pitch and yaw) and complex amplitudes $\alpha_m$ for which $\bar{G}^m_n$ best "matches" $G^m_n$. To do this, the measurement vectors $g_m=[G^m_1, \ldots ,G^m_N]'$ and signal model vectors $e_m(\Theta)=[\phi_{1m}(\Theta),\phi_{2m}(\Theta), \ldots ,\phi_{Nm}(\Theta)]'$ are first defined, where N is the total number of elements and (') denotes the matrix transpose operation. Therefore, $$g_m=\alpha_m e_m(\Theta)+n_m,$$

where $n_m$ is a complex random vector of noise values representing the errors in the measurements $G^m_n$. Next, vectors g, a, and n are matrix E are constructed as follows:

$$g=\begin{bmatrix}g_1\\g_2\\\cdot\\\cdot\\\cdot\\g_M\end{bmatrix}\quad a=\begin{bmatrix}\alpha_1\\\alpha_2\\\cdot\\\cdot\\\cdot\\\alpha_M\end{bmatrix}\quad n=\begin{bmatrix}n_1\\n_2\\\cdot\\\cdot\\\cdot\\n_M\end{bmatrix}$$

$$E(\Theta)=\begin{bmatrix}e_1(\Theta) & & & 0\\ & e_2(\Theta) & & \\ & & \ddots & \\ 0 & & & e_M(\Theta)\end{bmatrix}.$$

Therefore, g=E(Θ)a+n. It is assumed that the components of n are zero-mean complex Gaussian variables with $E\{Re(n)Im(n^H)\}=0$ and $E\{Re(n)Re(n^H)\}=E\{Im(n)Im(n^H)\}$, where the H denotes Hermitian transpose and E() denotes the expectation operation. A further definition is $\Sigma=E\{nn^H\}$.

With these definitions in place, it is then possible to write an expression that specifies the maximum likelihood (ML) solution to the attitude estimation problem. Denoting by $(\hat{a},\hat{\Theta})$ the corresponding ML estimates of (a,Θ), then $$\hat{\Theta} = \arg\max_{\Theta} F(\Theta),$$

with F(Θ) defined as $$F(\Theta)=g^H\Sigma^{-1}E(E^H\Sigma^{-1}E)^{-1}E^H\Sigma^{-1}g,$$

where the explicit dependence of E on Θ has been suppressed for clarity of notation. The amplitude estimate, though not explicitly required for attitude estimation, is given by $$\hat{a}=(E^H\Sigma^{-1}E)^{-1}E^H\Sigma^{-1}g,$$

The expressions above simplify greatly for the degenerate case in which the measurement errors are identically distributed; i.e., where $\Sigma=\sigma^2 I$. In this case, the ML estimate for the angle vector specifying the array attitude is given by $$\hat{\Theta} = \arg\max_{\Theta} \|E^H g\|^2 = \arg\max_{\Theta} \sum_{m=1}^{M} |e_m{}^H g_m|^2,$$

$\|v\|^2=v^H v$. The corresponding amplitude estimate is $$\hat{a} = \frac{1}{N} E^H g = \frac{1}{N} \sum_{m=1}^{M} e_m{}^H g_m.$$

Figure 2:
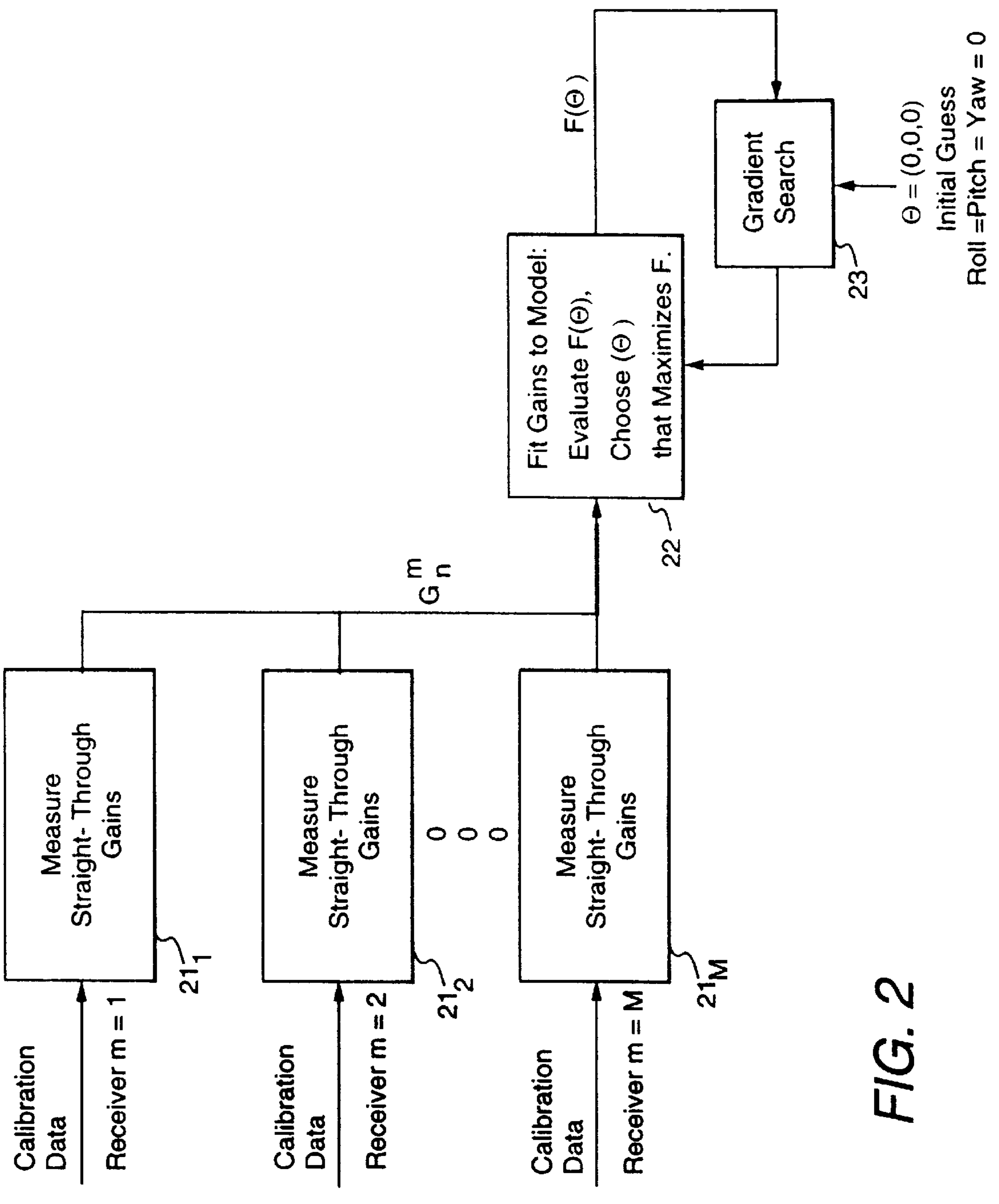
FIG. 2 is a block diagram illustrating the flow of the satellite-borne phased-array attitude estimation technique according to one aspect of the invention.

In the process illustrated in FIG. 2, the gains $G_n{}^m$ are fit to the model by evaluating $F(\Theta)$ and choosing $\Theta$ that maximizes F, as indicated at step 22. Maximization of the function $F(\Theta)$ can be carried out efficiently in practice by making use of any standard gradient search method 23. As shown in FIG. 2, the search begins at $\overline{\Theta}=(0,0,0)$, which implies no rotation at all, and thus represents the initial coarse knowledge of the array attitude. The solution obtained in this manner will be unique if the initial attitude uncertainty is commensurate with the level noted earlier.

Simulations based on a hypothetical 16×16 array in a geostationary position above a pair of receiver sites displaced ±3° from the boresight axis of the array demonstrate that approximately 0.001° to 0.01° of attitude precision can be obtained with the method just described. The experiments assume operation at 12 GHz with an element spacing of three wavelengths and a receiver signal-to-noise ratio (SNR) of 20 dB. This represents an improvement of one to two orders of magnitude with respect to the initial three-axis attitude uncertainty of 0.1°.

Figure 3:
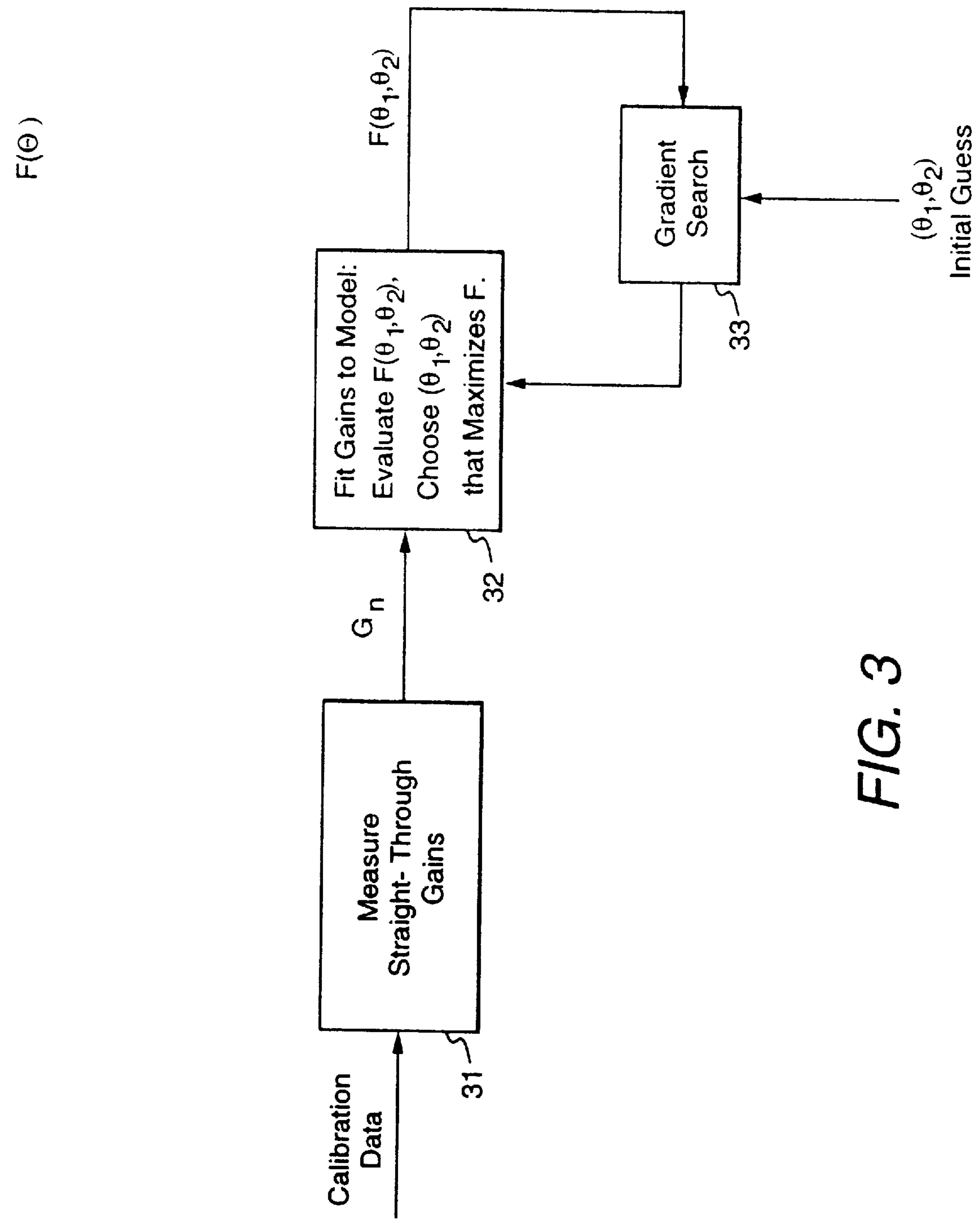
FIG. 3 is a block diagram illustrating the flow of the receiver bearing estimation technique according to a second aspect of the invention.

The method for estimating the precise bearing of a remote receiver with respect to the radiation coverage of a satellite-borne phased-array antenna 10 (as shown in FIG. 1) is a similar two-step process. As shown in FIG. 3, the first step 31 of this process requires measurement of the so-called "straight-through" signal path gains, as above. The straight-through gain for the nth array element, as seen from the receiver, is given by $$G_n = k \frac{e^{j\frac{2\pi}{\lambda}|\overline{R}-\overline{r}_n|}}{|\overline{R}-\overline{r}_n|},$$

where $\overline{R}$ is the receiver position, $\overline{r}_n$ are the element positions expressed in the local coordinate frame, $\lambda$ is wavelength, and k again represents the magnitude and phase of the radiation from the array in its "unsteered" state. In the far field, i.e., where $|\overline{r}_n|^2<<\lambda|\overline{R}|$, $G_n$ can be rewritten as $$G_n = k \frac{e^{j\frac{2\pi}{\lambda}R}}{R} e^{-j\frac{2\pi}{\lambda}(\hat{u}\cdot\overline{r}_n)} = \kappa e^{-j\frac{2\pi}{\lambda}(\hat{u}\cdot\overline{r}_n)},$$

where $$\kappa = \left(\frac{k}{R}\right) e^{j\frac{2\pi}{\lambda}R}$$

is another complex constant, $R=|\overline{R}|$, and $\hat{u}$ is a unit vector directed toward the receiver from the local origin.

In a steered array, the total gain imposed by each element is the product of $G_n$ and a selectable gain $A_n$, the values of which are chosen to achieve a desired antenna beam orientation and shape. The two quantities, $G_n$ and $A_n$, fully characterize the signal response of the array. However, only the straight-through gains $G_n$ are required for implementing the method according to this aspect of the invention, namely, estimation of the receiver bearing $\hat{u}$. Any method deemed suitable for measuring these straight-through gains can be successfully used in the bearing estimation procedure.

The second step in the bearing estimation procedure is to construct a model for the straight-through gains, as follows:

$$\overline{G}_n(\alpha,\theta_1,\theta_2) = \alpha e^{-j\frac{2\pi}{\lambda}[\hat{u}(\theta_1,\theta_2)\cdot\overline{r}_n]} = \alpha\,\phi_n(\theta_1,\theta_2).$$

In this expression, $\alpha$ is an unknown complex amplitude, and $\theta_1$ and $\theta_2$ are angles that define the receiver direction $\hat{u}$. The bearing estimation problem then reduces to finding that set of angles $(\theta_1, \theta_2)$, along with the corresponding $\alpha$ for which $\overline{G}_n$ best "matches" $G_n$. This is done by defining a measurement vector $g=[G_1,G_2, \ldots ,G_N]'$ and a signal model vector $e(\theta_1,\theta_2)=[\phi_1(\theta_1,\theta_2), \phi_2(\theta_1,\theta_2), \ldots , \phi_N(\theta_1,\theta_2)]'$, where N is the total number of elements and (') denotes the matrix transpose operation. Therefore $$g=\alpha e(\theta_1,\theta_2)+n$$

where n is a complex random vector of noise values representing the errors in the measurements $G_n$. By assuming that the components of n are zero-mean complex Gaussian variables with $E\{Re(n)Im(n^H)=0$ and $E\{Re(n)Re(n^H)\}=E\{Im(n)Im(n^H)\}$, where the H denotes Hermitian transpose and E() denotes the expectation operation, and by defining $\Sigma=E\{nn^H\}$, it is then possible to write an expression that specifies the maximum likelihood (ML) solution to the bearing estimation problem. Denoting by $(\alpha,\hat{\theta}_1,\hat{\theta}_2)$ the corresponding ML estimates of $(\alpha,\theta_1,\theta_2)$, then $$(\hat{\theta}_1,\hat{\theta}_2) = \arg\max_{\theta_1,\theta_2} F(\theta_1,\theta_2),$$

with $F(\theta_1, \theta_2)$ defined as $$F(\theta_1,\theta_2)=g^H\Sigma^{-1}e(e^H\Sigma^{-1}e)^{-1}e^H\Sigma^{-1}g,$$

where the explicit dependence of e on $(\theta_1, \theta_2)$ has been suppressed for clarity of notation. The amplitude estimate, though not explicitly required for bearing estimation, is given by $$\hat{a}=(e^H\Sigma^{-1}e)^{-1}e^H\Sigma^{-1}g.$$

As before, the expressions above simplify greatly for the degenerate case in which the measurement errors are identically distributed; i.e., where $\Sigma=v^2 I$. In this case, the ML estimates for the angles specifying the receiver direction are given by $$(\hat{\theta}_1,\hat{\theta}_2) = \arg\max_{\theta_1,\theta_2} |e^H g|^2,$$

and the corresponding amplitude estimate is $$\hat{a}=1/Ne^H g.$$

Maximization of the function $F(\theta_1,\theta_2)$ at step 32 of FIG. 3 can be carried out efficiently in practice by making use of any standard gradient search method, as indicated at step 33. As shown in FIG. 3, the search begins at the values for $(\theta_1,\theta_2)$ that correspond to the initial coarse knowledge of the receiver direction with respect to the array. The solution obtained in this manner will be unique if the initial direction uncertainty is commensurate with the level noted above.

Simulations based on a hypothetical 16×16 array in a geostationary position above a receiver site displaced 5° from the boresight axis of the array demonstrate that approximately 0.001° to 0.004° of directional precision can be obtained with the method just described. The experiments assume operation at a frequency of 12 GHz with an element spacing of three wavelengths and a receiver signal-to-noise ratio (SNR) of 20 dB.

This represents an improvement of one to two orders of magnitude with respect to the initial uncertainty of 0.1° to 0.2°.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by letters patent is as follows:

1. A method for estimating in a computer the precise three-axis attitude of a space-borne phased-array antenna made up of a plurality of radiating elements, comprising the steps of:

inputting to the computer the array geometry, including the number of radiating elements and their relative spacing in three dimensions, and the array position and coarse knowledge of the array attitude;

simulating a straight-through antenna configuration as a condition in which all of the radiating elements are made to radiate with the same amplitude and phase;

estimating in the computer a set of complex-valued gains that define a straight-through contribution by each of the radiating elements to the signals received at each of two or more remote receiver calibration sites; and employing an optimization strategy in the computer to determine which array attitude lying in the neighborhood of the coarsely known attitude is most consistent with the set of straight-through gain values determined in the estimating step.

2. The method for estimating in a computer the precise three-axis attitude of a space-borne phased-array antenna of claim 1 wherein the step of estimating in the computer a set of complex-valued gains comprises the steps of:

measuring at each of said two or more remote receiver calibration sites straight-through signal path gains; and constructing a model for a full set of straight-through gains based on the measured straight-through signal path gains.

3. The method for estimating in a computer the precise three-axis attitude of a space-borne phased-array antenna of claim 2 wherein $G^m_n$ denotes the gains measured at a receiver calibration site m, where m=1,2,. . . ,M, and M is the number of receiver sites and, as seen from the mth receiver site, the straight-through gain for the nth element of the phased-array antenna is given by $$G_n^m = k\frac{e^{j\frac{2\pi}{\lambda}|\bar{R}_m-\bar{r}_n|}}{|\bar{R}_m-\bar{r}_n|},$$

where $\bar{R}_m$ is the receiver position, $\bar{r}_m$ are the element positions expressed in a local coordinate frame, and $\lambda$ is wavelength, and in the far field where $|\bar{r}_n|^2<<\lambda|\bar{R}_m|$, $$G_n^m = k\frac{e^{j\frac{2\pi}{\lambda}R_m}}{R_m}e^{-j\frac{2\pi}{\lambda}(\hat{u}_m\cdot\bar{r}_n)} = \kappa_m e^{-j\frac{2\pi}{\lambda}(\hat{u}_m\cdot\bar{r}_n)},$$

where $$\kappa_m = \left(\frac{k}{R_m}\right)e^{j\frac{2\pi}{\lambda}R_m},$$

$R_m=|\bar{R}_m|$, and $\hat{u}_m$ is a unit vector directed toward the receiver calibration site from the local origin, and wherein the model constructed for the full set of straight-through gains is expressed as $$\bar{G}_n^m(\alpha_m,\Theta) = \alpha_m e^{-j\frac{2\pi}{\lambda}[\hat{u}_m(\Theta)\cdot\bar{r}_n]} = \alpha_m\phi_{nm}(\Theta),$$

where $\alpha_m$ is a site-dependent, unknown complex amplitude, and $\Theta$ represents a set of angles that define the attitude of the array, and wherein the step of employing an optimization strategy in the computer to determine which array attitude lying in the neighborhood of the coarsely known attitude is most consistent with the set of straight-through gain values comprises finding a set of rotational angles $\Theta$ and complex amplitudes $\alpha_m$ for which $\bar{G}^m_n$ best matches $G^m_n$.

4. A method for estimating in a computer the precise angular location of a receiver with respect to the coordinates of a space-borne phased-array antenna made up of a plurality of radiating elements, comprising the steps of:

inputting to the computer the array geometry, including the number of radiating elements and their relative spacing in three dimensions, and coarse knowledge of the receiver bearing;

simulating a straight-through antenna configuration as a condition in which all of the radiating elements are made to radiate with the same amplitude and phase;

estimating in the computer a set of complex-valued gains that define a straight-through contribution by each of the radiating elements to a composite signal measured at the receiver site; and employing an optimization strategy in the computer to determine which receiver direction lying in the neighborhood of the coarsely known bearing is most consistent with the set of straight-through gain values determined in the estimating step.

5. The method for estimating in a computer the precise angular location of a receiver with respect to the coordinates of a space-borne phased-array antenna of claim 4 wherein the step of estimating in the computer a set of complex-valued gains comprises the steps of:

measuring at said remote receiver site straight-through signal path gains; and constructing a computer model for a full set of straight-through gains based on the measured straight-through signal path gains.

6. The method for estimating in a computer the precise angular location of a receiver with respect to the coordinates of a space-borne phased-array antenna of claim 5 wherein $G_n$ denotes the straight-through gain for the nth array element as seen from the receiver, and is given by $$G_n = k \frac{e^{j\frac{2\pi}{\lambda}|\bar{R}-\bar{r}_n|}}{|\bar{R}-\bar{r}_n|},$$

where $\bar{R}$ is the receiver position, $\bar{R}_n$ are the element positions expressed in a local coordinate frame, λ is wavelength and k represents the magnitude and phase of the radiation from the array in an unsteered state and, in the far field where $|\bar{r}_n|^2 << \lambda|\bar{R}$, $$G_n = k \frac{e^{j\frac{2\pi}{\lambda}R}}{R} e^{-j\frac{2\pi}{\lambda}(\hat{u}\cdot\bar{r}_n)} = \kappa e^{-j\frac{2\pi}{\lambda}(\hat{u}\cdot\bar{r}_n)},$$

where $$\kappa = \left(\frac{k}{R}\right) e^{j\frac{2\pi}{\lambda}R},$$

$R=|\bar{R}|$, and $\hat{u}_m$ is a unit vector directed toward the receiver from the local origin, and wherein the model constructed for the set of straight-through gains is expressed as $$\bar{G}_n(\alpha,\theta_1,\theta_2) = \alpha e^{-j\frac{2\pi}{\lambda}[\hat{u}(\theta_1,\theta_2)\cdot\bar{r}_n]} = \alpha\,\phi_n(\theta_1,\theta_2).$$

where α is an unknown complex amplitude and $\theta_1$ and $\theta_2$ are angles that define the receiver direction û, and wherein the steps of employing an optimization strategy in the computer to determine which receiver direction lying in the neighborhood of the coarsely known bearing is most consistent with the set of straight-through gain values determined in the estimating step comprises finding a set of angles $(\theta_1, \theta_2)$ along with the corresponding α for which $\bar{G}_n$ best matches $G_n$.

* * * * *